US00RE35846E

United States Patent [19]

Aaron

[11] E Patent Number: Re. 35,846

[45] Reissued Date of Patent: Jul. 14, 1998

[54] SHEET SORTING APPARATUS

[75] Inventor: Jack Aaron, Tustin, Calif.

[73] Assignee: Gradco (Japan) Ltd., Tokyo, Japan

[21] Appl. No.: 725,812

[22] Filed: Oct. 4, 1996

Related U.S. Patent Documents

Reissue of:

[64] Patent No.: 5,351,947
Issued: Oct. 4, 1994
Appl. No.: 985,553
Filed: Dec. 3, 1992

U.S. Applications:

[63] Continuation-in-part of Ser. No. 696,772, May 7, 1991, Pat. No. 5,169,144.

[51] Int. Cl.[6] ..... B65H 31/24

[52] U.S. Cl. ..... 271/293; 271/294; 267/169; 267/174; 267/180; 267/291

[58] Field of Search ..... 271/293, 294; 267/161, 174, 180, 291

[56] References Cited

U.S. PATENT DOCUMENTS

| | | | |
|---|---|---|---|
| 4,397,069 | 8/1983 | Camossi | 267/169 |
| 4,671,505 | 6/1987 | Hidaka | 271/294 |
| 4,747,634 | 5/1988 | Hoke | 267/169 |
| 5,169,144 | 12/1992 | Aaron | 271/293 |
| 5,351,947 | 10/1994 | Aaron | 271/293 |

FOREIGN PATENT DOCUMENTS

| | | | |
|---|---|---|---|
| 0246585 | 11/1987 | European Pat. Off. | 271/294 |

*Primary Examiner*—H. Grant Skaggs

[57] ABSTRACT

The vertical stack of trays in a movable tray sorter for sheets of paper exiting a [copies] *copier* is moved in a manner to enlarge the spacing between consecutive pairs of the trays to accept consecutive sheets of paper by moving the trays along a pair of helical coils, each of which has a turn of relatively coarse pitch. The turns of relatively coarse pitch are located at the copier paper chute and causes an increased separation of adjacent trays only at that position as the coils are turned. *The coils support the trays approximately midway between the ends of the trays in a sheet feeding direction and the sorter has vertically extended guides at opposite sides of the trays adjacent one end in which side portions of said trays slide to maintain the trays substantially parallel.*

11 Claims, 6 Drawing Sheets

SHEET SORTING APPARATUS

Matter enclosed in heavy brackets [ ] appears in the original patent but forms no part of this reissue specification; matter printed in italics indicates the additions made by reissue.

REFERENCE TO RELATED PATENT APPLICATION

This present application is *for Re-issue of U.S. Pat. No. 5,351,947 dated Oct. 4, 1994 based on Ser. No. 985,553 filed Dec. 3, 1992 which was* a continuation-in-part of U.S. patent application Ser. No. 07/696,772 filed May 7, 1991 now U.S. Pat. No. 5,169,144 for the present application and assigned to the assignee of the present application.

FIELD OF THE INVENTION

This invention relates to paper sheet processing machines. More particularly, this invention relates to compact paper sheet sorting machines of the shifting tray type.

BACKGROUND OF THE INVENTION

A variety of compact sorting machines exist for receiving and sorting sheets from am output slot of a paper sheet processing machine, such as a copy machine. Generally, these sorting machines provide a number of trays supported in a compact vertical stack, each of which, in turn, is capable of traversing past the sheet output slot. To accommodate paper entry into each receiving tray in turn, a relatively large gap is required between the receiving tray and the tray immediately above the receiving tray. Tray spacing elsewhere may be minimized in order to increase the compactness of the vertical stack. Several tray shifting methods have been devised to accomplish this variable tray spacing requirement.

THE PRIOR ART

One sheet sorting machine, taught in U.S. Pat. No. 4,343,463 issued to Lawrence on Aug. 10, 1982, uses two rotating spiral cams to shift each tray, in turn, past the output slot of a copy machine. Other sorting machines also utilize this tray shifting means.

Another tray shifting method, taught in U.S. Pat. No. 4,328,963 issued DuBois and Hamma on May 11, 1982 utilizes two rotating wheels, each with two or more notches formed in their perimeters. Upon rotation of each wheel, one notch engages a trunnion on either side of the next tray to be shifted and transports it along a track otherwise blocked by the wheel. The prior art teaches, in moving bin sorting machines, that all trays, as an assembly, and in some cases, for example, as taught in U.S. Pat. No. 4,911,424 issued to Lawrence on Mar. 27, 1990, a retaining frame as well, must be lifted by a single pair of trunnions, one on each side of the assembly.

Clearly, then, there is a need for a simple, reliable method of shifting trays sequentially past an output slot of a copy machine while providing a larger distance between the receiving tray and the tray immediately above the receiving tray, and a smaller distance between each of the other adjacent trays. The present invention fulfills these need and provides further related advantages.

SUMMARY OF THE INVENTION

The present invention is a sorting apparatus for paper sheets that utilizes a pair of helical coils or screws to shift trays past the output slot of a copy machine or the like. Each coil is predominantly wound with a plurality of turns of a first pitch, and also includes at least one turn of a second, coarser pitch. Each coil is rotatably supported in a generally vertical attitude. A reversible rotational driving means, such as an electric motor and a drive train, rotate the coils around their longitudinal axes at the same speed and in the same direction. A number of trays suitable for supporting a plurality of sheets are arranged in a vertical stack. An attachment means, such as a nut, is mounted to each of two sides of each tray, each attachment means having a helical passageway therethrough for accepting at most one revolution of a coil therein. In one embodiment, a helical coil is connected to about the midpoint of the side of each tray by means of one of the above-mentioned nuts. The front edge of each tray includes a pair of laterally projecting extensions each of which fits into an associated vertical guide. Both of the coils and the guide are oriented vertically such that the trays are maintained always in the same horizontal orientation as they are moved, in succession, to the position of the paper chute. In this manner, adjacent trays do not impact one another ever, less friction is encounter, trays do not protrude beyond the initial positions for them during operation, and trays do not need a vertical lip to allow one tray to ride upon the next lower tray during operation.

In operation, the rotational driving means, upon receiving a signal from a conventional control circuit of the copy machine, rotates the coils, thereby shifting all trays either up or down in accordance with the rotational direction of the coils. Consequently, each tray having the attachment means engaged in the coils of the first pitch moves at a first speed upward or downward as the pair of coils turn. Each tray moves at a second, faster speed when the attachment means moves to the second pitch, so that the space between trays increases as each tray moves to the second pitch. This mechanism allows a sheet of paper to feed more easily into a tray positioned with the increased spacing.

The tray shifting method of the invention disclosed herein has the advantage of utilizing a minimum number of moving parts, decreasing the complexity and cost of its manufacture. Moreover, the present invention is not dependent upon complex tray support frames, or spring tensioning means, and as a result is less likely to jam or otherwise malfunction. Another important advantage of the current invention is that all trays are supported and lifted individually. This requires only about 25% of the driving torque as compared to prior art devices, resulting in lower wear, longer life, and lower power use. Prior art devices requiring large torque application are limited to slower speeds and create high levels of audible noise, while the current invention has been able to achieve relatively high speeds at reduced audible noise levels. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawing.

DETAILED DESCRIPTION OF THE PREFERRED EMBODIMENT

Figure 1:
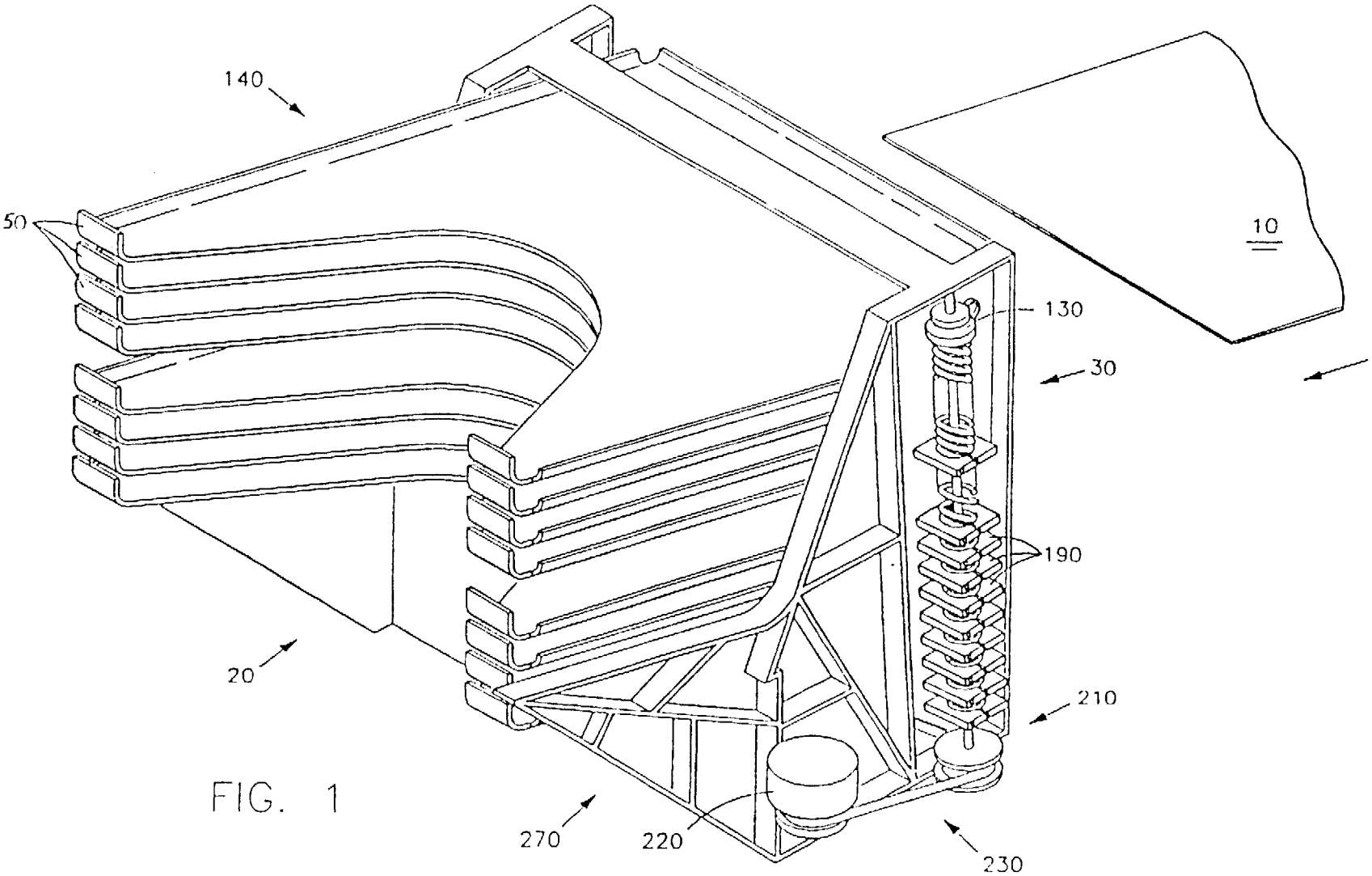
FIG. 1 is a perspective view of the invention, illustrating a coil and a number of lift blocks of the invention.
Figure 4:
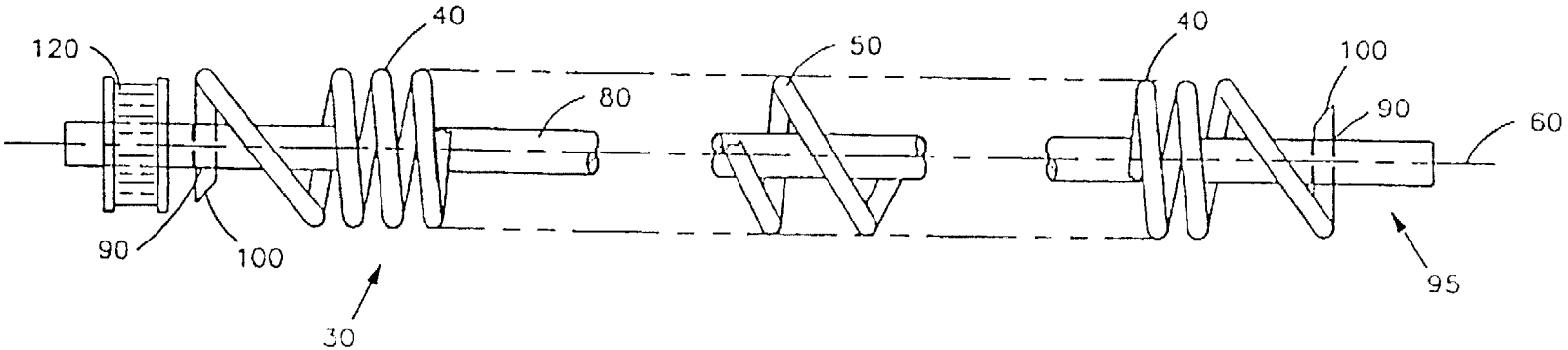
FIG. 4 is a front view of a coil and center rod of the embodiment of FIG. 1.

FIG. 1 shows a sorting apparatus 20 of the shifting tray type for sheets 10. As shown in FIG. 4, helical coils 30 are wound with a plurality of turns of a first pitch 40, and at least one turn of a second, coarser pitch 50. Each coil 30 has a central longitudinal axis 60 therein. A center rod 80 is positioned on an axis 60 of each coil 30. Each center rod 80 has a pair of transverse through holes 90 positioned to receive the ends 100 of one coil 30. Preferably, each coil 30 and center rod 80 are made from a strong, rigid material, such as steel.

In an alternate embodiment of the invention, each coil 30 is replaced by a screw 111 (FIG. 7A and 7B), eliminating the need for the center rod 80. The cost of manufacturing a screw with a first pitch 41 and a second, coarser pitch 51 is higher than that of manufacturing coil 30 plus center rod 80, and as a result is not the preferred mode of the invention. Clearly, however, both the coil 30 and the screw 111 operate in a similar fashion and produce the same result.

Figure 2:
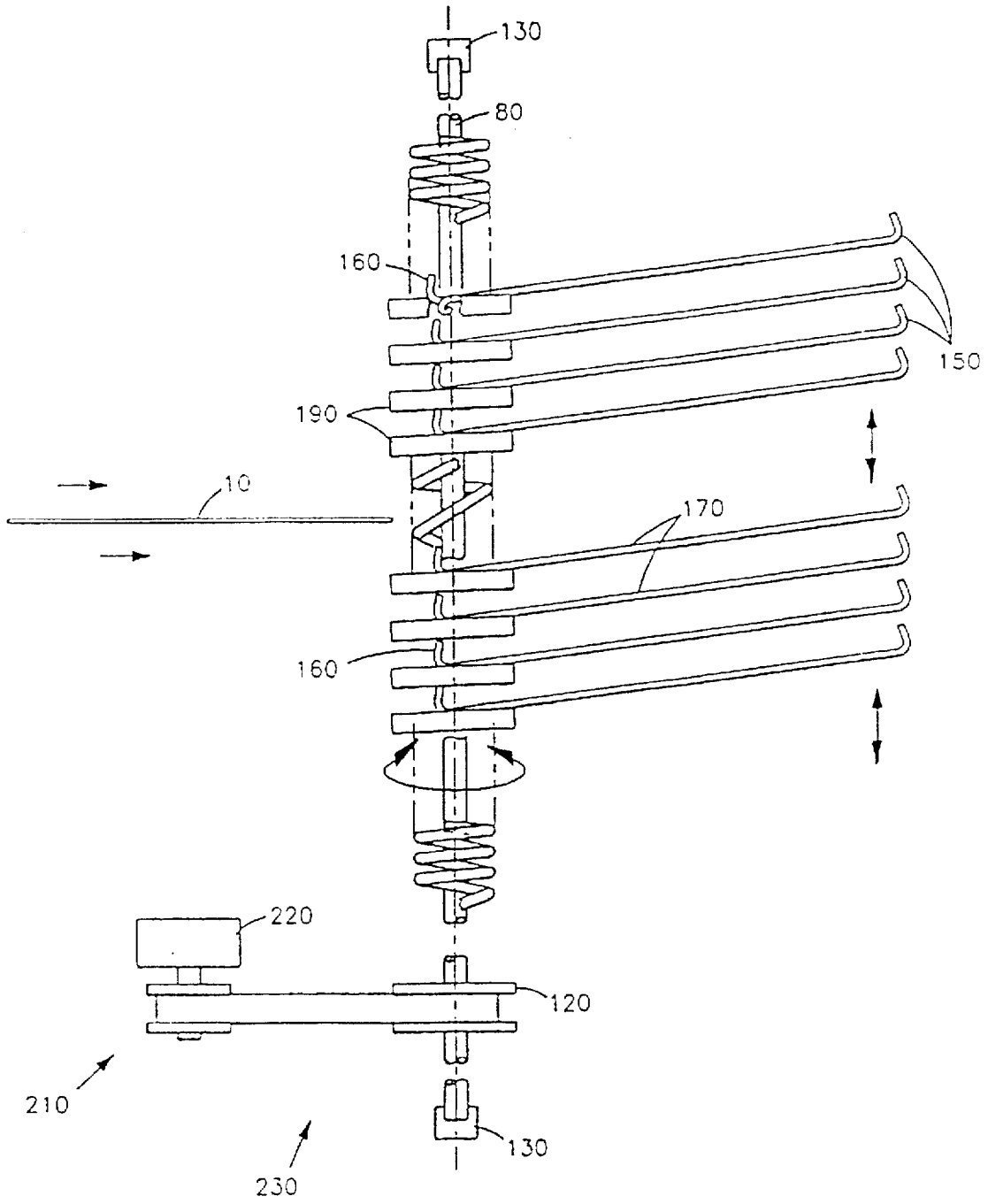
FIG. 2 is a schematic right side elevation view of the embodiment of FIG. 1, showing a tray stack and means for accommodating a paper sheet into a tray.
Figure 3:
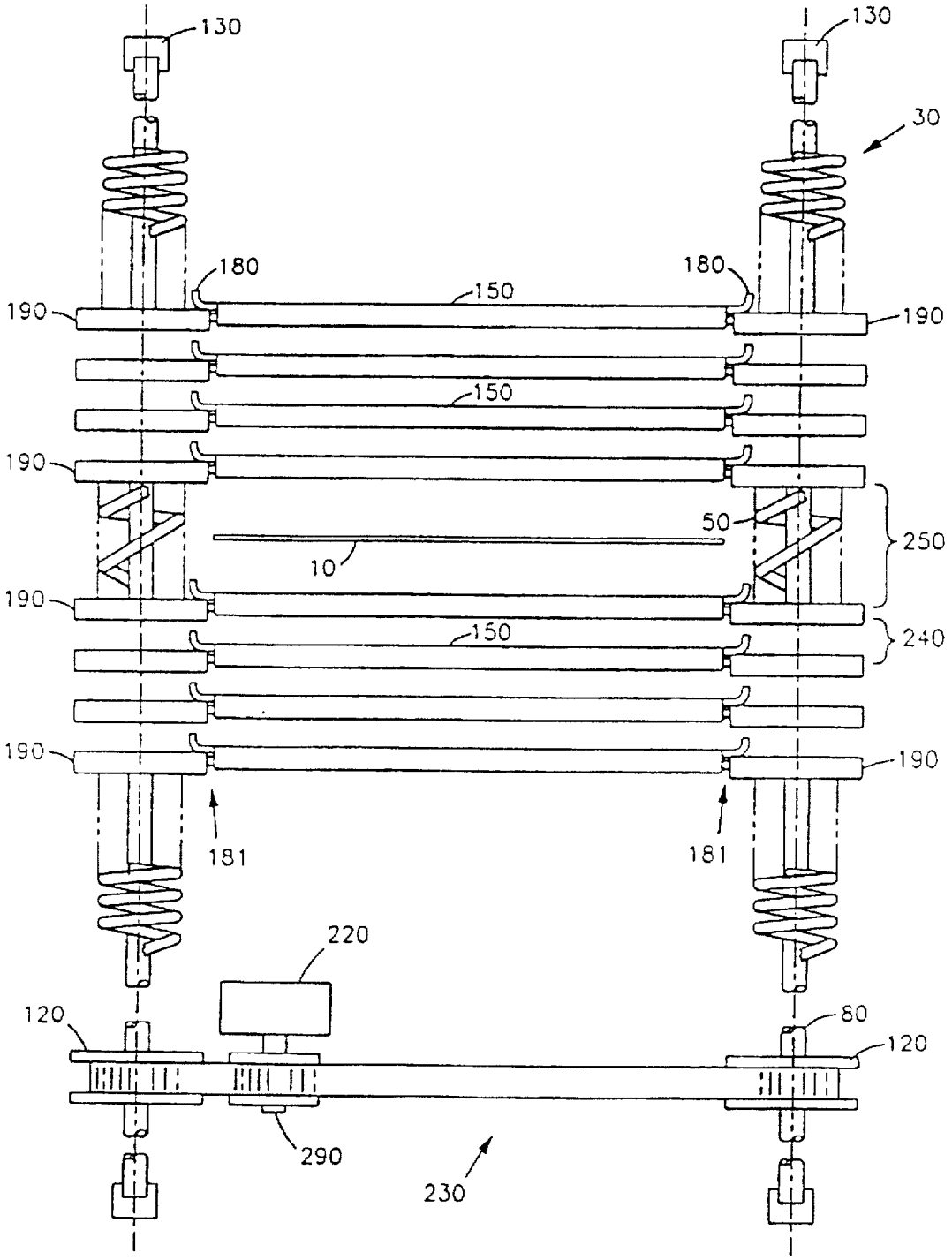
FIG. 3 is a schematic front elevation view of the embodiment of FIG. 1.
Figure 5:
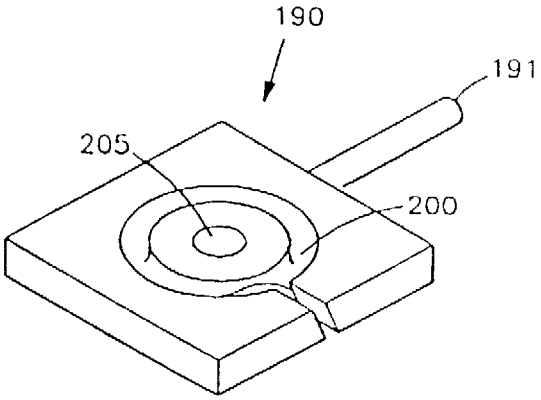
FIG. 5 is a perspective illustration of a tray lift block of the embodiment of FIG. 1.

As shown in FIGS. 2 and 3, a rotational drive coupling means 120 is fixed to each center rod 80. Each center rod 80 is held in a near vertical attitude by a pair of rotational support means 130. A rotational driving means 2 10 comprises, in the preferred mode of the invention, a prime mover 220 and a drive train 230. Preferably, the prime mover 220 is a reversible electric motor, and the drive train 230 is a flexible drive belt interconnecting the shaft 290 of the electric motor with the rotational drive coupling means 120 of each center rod 80. When activated, the rotational driving means 210 drives each coil 30 in the same direction at the same speed.

A plurality of trays 150, preferably of a strong yet light plastic material, are arranged in a vertical stack 140, each tray 150 having a leading edge 160 for receiving the sheets 10, and a surface 170 for supporting the sheets 10. Each tray 150 has two tray lift blocks 190, mounted on opposite sides of the tray 150. The blocks 190 have a helical passageway 200 for accepting at most one turn of one coil 30, allowing the coil 30 to pass through only when the coil 30 is rotated relative to the block 190. Each tray lift block 190 has a center rod hole 205, which is a clearance hole for the passage of the center rod [180] *80*. The trays 150 are oriented so that the tray lift blocks 190 are engaged with the coils 30, the coils 30 being positioned on opposite sides of the trays 150 and thereby holding the trays 150 in position in the vertical stack 140. In the preferred mode of the invention, each tray lift block 190 is made of a strong plastic with a low coefficient of friction to facilitate the passage of one coil 30 through the helical passageway 200.

Figure 7A:
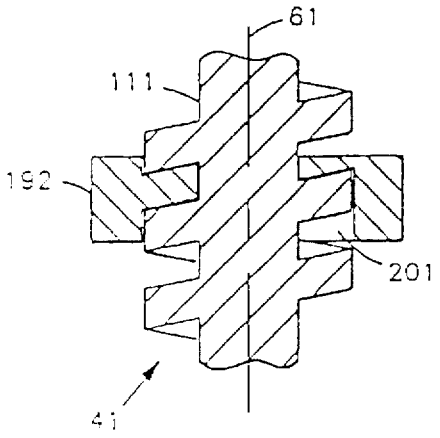
FIG. 7A is a fragmentary cross sectional view of a tray lift block and one turn of a threaded screw at threads of a first pitch.
Figure 7B:
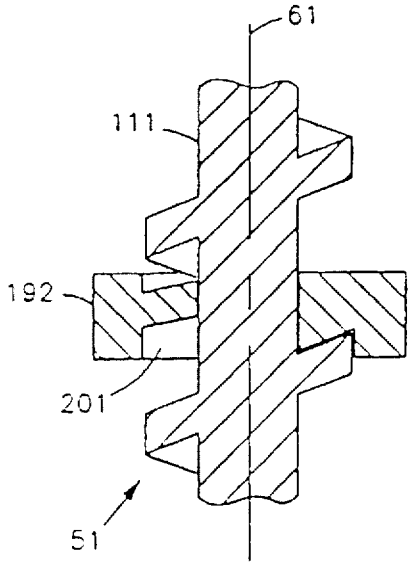
FIG. 7B is a fragmentary cross sectional view of a tray lift block and one turn of a threaded screw at threads of a second, coarser pitch.
Figure 6A:
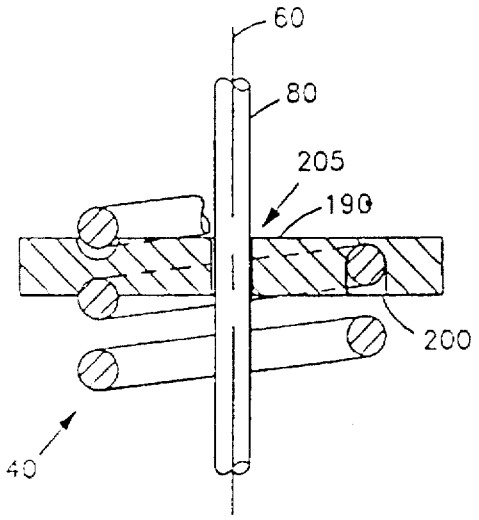
FIG. 6A is a fragmentary cross sectional view of a tray lift block and one turn of a coil of a first pitch.
Figure 6B:
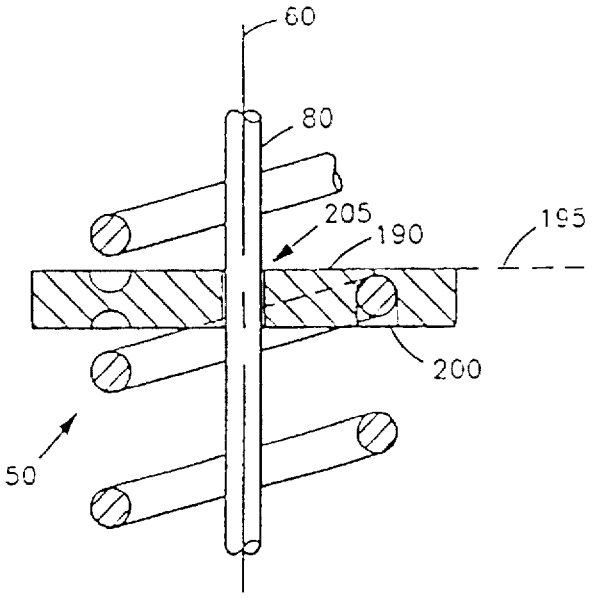
FIG. 6B is a fragmentary cross sectional view of a tray lift block and one turn of a coil of a second, coarser pitch.

In an alternate embodiment the coils 30 are replaced by screws 111 and tray lift blocks 190 are replaced by tray lift nuts 192 (FIGS. 7A and 7B).

The prime mover 220 is able to rotate the coils 30 in either direction, causing the blocks 190 to traverse the coils 30 and further to cause the leading edges 160 of the trays 150 to change vertical position. As a result, all trays 150 may be brought into a position to receive sheet 10 which is normally ejected from a copy machine or similar apparatus. As trays 150 move upward or downward they maintain a normal close spacing 240, as shown in FIG. 3, as long as the blocks are engaged on first pitch 40 of coils 30. As the blocks 190 of a given tray 150 moves rapidly away from the following tray 150, thereby opening up a wider space 250. The wider space 250 provides improved clearance for incoming sheet 10 to enter the following tray 150. This same result occurs for each following tray 150 in turn.

Figure 8:
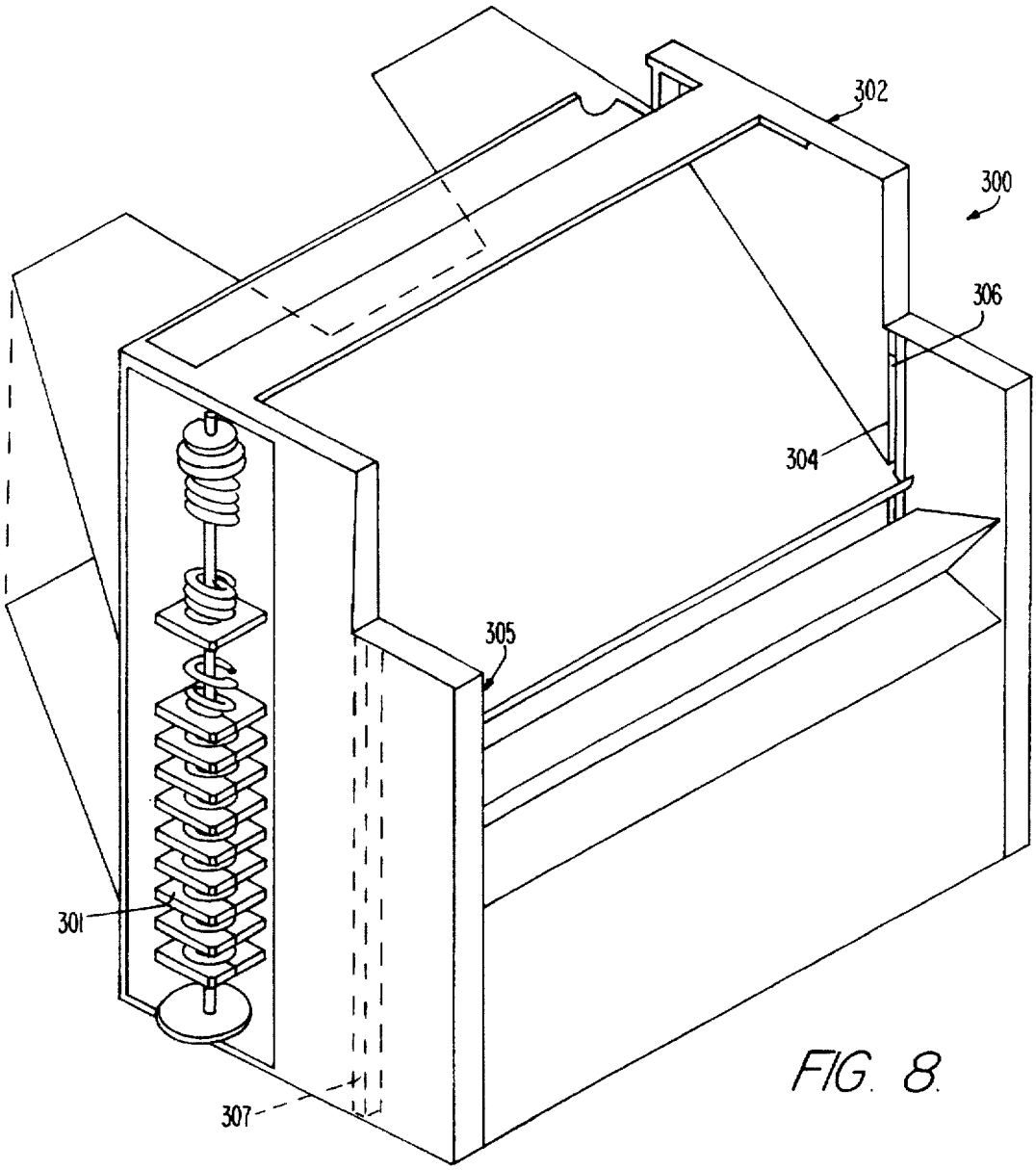
FIG. 8 is a perspective view of an alternative embodiment of the invention.

FIG. 8 shows an alternative embodiment 300 of this invention. The helical coils 301 (and 302 not shown) of this embodiment are positioned midway along the sides of the trays and are oriented vertically. In addition, each tray 303 includes a pair of lateral extensions 304 (and 305 not shown) which mate with guides 306 and 307, respectively, at the front (paper-receiving) edge of the trays. The vertical orientation of the coils and the guides operate to maintain the trays in plane parallel to the initial orientations even as the trays move past the paper entrance position. The arrangement thus keeps the trays from impacting one another as mentioned herein above.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A sheet sorting apparatus of the shifting tray type for receiving paper sheets, comprising[;]*:* a pair of helical coils, each coil of said pair of helical coils being predominantly [would] *wound* with a plurality of turns of a first pitch, and containing at least one turn of a second pitch, the second pitch being coarser than the first pitch, each coil having a longitudinal axis;

means for rotational support, the support means holding the coils in positions wherein said longitudinal axes of the coils are approximately parallel to each other;

means for rotational drive, the drive means rotating each coil about said longitudinal axis, both coils rotating in the same sense and at the same speed of rotation;

a plurality of trays arranged in a stack, each said tray being separated from an adjacent said tray by a space, each tray having a leading edge for receiving the sheets, two side edges on either side of the leading edge, the side edges defining the sides of the stack, and a surface for supporting the sheets, one said coil being positioned adjacent to each of said sides of the stack;

one of said coils being positioned at about the center of each of said side edges; and a plurality of tray lift blocks, each tray having a pair of the tray lift blocks [for] *providing* attachment [of] *means connecting* the tray to coils, each tray lift block having a means for tray engagement and a helical shaped guideway therethrough, the guideway providing clearance for sliding engagement of the tray lift block with the coil so that as the coil rotates the attachment means moves along the coil in accordance with the direction of rotation of the coil;

said apparatus including a pair of vertical guides, each of said leading edges of said trays including extensions for engaging said guides;

whereby the stack of trays move along the pair of coils as the coils rotate, the space between each pair of adjacent trays being approximately equal for adjacent trays moving on the coil turns of the first pitch, the space between each pair of adjacent trays growing to a larger spacing as each tray moves into the coil turns of the second pitch, the larger spacing facilitating the ingress of the sheet of paper, so that each tray in turn may receive a paper sheet.

2. The apparatus of claim 1 wherein the helical shaped guideway encompasses approximately one complete coil turn of the first pitch and a fraction of a coil turn of the second pitch.

3. The apparatus of claim 1 further including a center rod for mounting the coil, each end of the center rod having a traverse through hole for accepting one end of the coil, the rod being positioned coaxially through the coil, and wherein the attachment means has a clearance hole for passage of the center rod, the center rod acting to restrain the tray lift block from tilting out of planes orthogonal to the axis of the coil.

4. Apparatus comprising a helical coil of solid cross-section, said coil being wound predominantly with a plurality of turns of the same sense and a first pitch and containing one turn of a second pitch of the same sense as but coarser than said first pitch, said coil having a longitudinal axis and a rotary drive positioned co-axially and extending along said axis and connected to the ends of said coil, [said] *including a* rod [being] secured to said ends of said coil and being of a length [of] *to* maintain said coil in a rigid configuration along said axis, and including a plurality of lift blocks shiftably disposed on said coil, each of said lift blocks having a helical path therethrough, said path being of a geometry to accept at most one turn of said coil and also having therethrough a center hole for communicating with said rod.

5. Apparatus as set forth in claim 4 wherein said rod engages [a] *associated* means for rotating said rod along said axis.

6. First and second apparatus as set forth in claim 5 in fixed spaced apart positions and control means for synchronizing the associated means for rotating.

7. [Apparatus] *First and second apparatus* as set forth in claim 6 including a plurality of trays and means for organizing said trays into a vertical *stack*, each of said trays being connected to like numbered lift blocks associated with said coils of said first and second apparatus.

8. [Apparatus] *First and second apparatus* as set forth in claim 7 including *rotational drive* means for activating said associated means for rotating said coils in a manner to move said lift blocks along respective ones of said longitudinal axes, said means for organizing being of a geometry to constrain movement of said trays vertically to consecutive horizontal positions of said stack.

9. [Apparatus] *First and second apparatus* as set forth in claim 8 [therein] *wherein* said one turn of a second pitch is aligned with the position of a paper feed such that the movement of said trays to successive [horizontal] *vertical* positions is operative to increase the spacing between the tray aligned with said position and the tray aligned with the next adjacent position.

*10. A sheet sorting apparatus of the shifting tray type for receiving paper sheets fed into the trays from a copier or printer, comprising:*

*a pair of helical cams providing coils, each coil of said pair of helical coils being predominantly wound with a plurality of turns of a first pitch, and containing at least one turn of a second pitch, the second pitch being coarser than the first pitch, each coil having a longitudinal axis;*

*means for rotational support, the support means holding the coils in positions wherein said longitudinal axes of the coils are approximately parallel to each other;*

*means for rotational drive, the drive means rotating each coil about said longitudinal axis, both coils rotating in the same speed of rotation;*

*a plurality of trays arranged in a stack, each said tray being separated from an adjacent said tray by a space determined by the first and second pitch, each tray having a leading end facing upstream of the paper sheet infeed direction for receiving the sheets and a downstream end and two side edges extending between said leading end and downstream end;*

*one of said coils being positioned at about the center of each of said side edges;*

*means for moving said trays in response to operation of said means for rotary drive including follower members on the opposite side edges of each tray for engagement with the coils so that as the coils rotate the follower members cause said trays to move along the respective coils in accordance with the direction of rotation of the coil;*

*said apparatus including a pair of vertical guides, each of said side edges of said trays including extensions adjacent one of said ends of said trays for engaging said guides to maintain the trays parallel;*

*whereby the stack of trays moves along the pair of coils as the coils rotate, the space between each pair of adjacent trays being approximately equal for adjacent trays moving on the coil turns of the first pitch, the space between each pair of adjacent trays growing to a larger spacing as each tray moves into the coil turns of the second pitch, the larger spacing facilitating the ingress of the sheet of paper, so that each tray in turn may receive the sheets of paper.*

*11. A sheet sorting apparatus as defined in claim 10 wherein said vertical guides and said extensions on said trays are located at the leading end of said trays.*

* * * * *